(12) United States Patent
Lu

(10) Patent No.: US 6,678,539 B1
(45) Date of Patent: Jan. 13, 2004

(54) MOBILE PHONE COVER HINGE

(76) Inventor: Sheng-Nan Lu, No. 174, Chunying St. Shulin Chen, Taipei Hsien (TW)

( * ) Notice: Subject to any disclaimer, the term of this patent is extended or adjusted under 35 U.S.C. 154(b) by 560 days.

(21) Appl. No.: 09/765,618

(22) Filed: Jan. 22, 2001

(51) Int. Cl.[7] ................................................ H04M 1/00
(52) U.S. Cl. ........................ 455/575.1; 455/575.3; 455/90.3; 455/128; 379/433.13; 16/280
(58) Field of Search ............................ 455/90.3, 575.1, 455/575.3, 128; 16/280, 285; 361/683, 814; 379/433.13

(56) References Cited

U.S. PATENT DOCUMENTS

| 5,636,275 A | * | 6/1997 | Takagi et al. | .......... 379/433.13 |
| 5,640,690 A | * | 6/1997 | Kudrna | .................... 455/575.3 |
| 5,704,094 A | * | 1/1998 | Hartigan et al. | .............. 16/303 |
| 5,915,440 A | * | 6/1999 | Repo | ........................... 16/330 |
| 5,930,353 A | * | 7/1999 | Lee et al. | .............. 379/433.05 |
| 6,011,699 A | * | 1/2000 | Murray et al. | ............... 361/814 |
| 6,065,187 A | * | 5/2000 | Mischenko | ................... 16/341 |
| 6,115,886 A | * | 9/2000 | Fujita | ........................... 16/330 |
| 6,148,480 A | * | 11/2000 | Cooke | ......................... 16/303 |
| 6,195,431 B1 | * | 2/2001 | Middleton | ............. 379/433.13 |
| 6,256,481 B1 | * | 7/2001 | Jeong et al. | ............. 455/575.3 |
| 6,320,961 B1 | * | 11/2001 | Hayasaka | .............. 379/433.13 |
| 6,493,542 B1 | * | 12/2002 | Frohlund | ................... 455/90.1 |

* cited by examiner

*Primary Examiner*—Vivian Chin
*Assistant Examiner*—Tuan Tran
(74) *Attorney, Agent, or Firm*—Bacon & Thomas PLLC

(57) ABSTRACT

A mobile phone cover hinge has a driven block slidably mounted in a sleeve that is securely received in the mobile phone body and a driving block rotatably mounted in the cover of the mobile phone. When the cover pivots in a first direction, the driving block pushes the driven block so as to compress the first spring received in the sleeve. When the cover pivots in a second direction opposite to the first direction, the compressed first spring will facilitate the cover to return to its original position.

4 Claims, 3 Drawing Sheets

MOBILE PHONE COVER HINGE

BACKGROUND OF THE INVENTION

1. Field of the Invention

The present invention relates to a mobile phone cover hinge, and more particularly to a mobile phone cover hinge that allows the mobile phone cover to be easily engaged with the mobile phone body. The cover hinge includes a driving block partially received in the mobile phone cover and a driven block received in the mobile phone body and detachably engaged with the driving block. Springs respectively received in the mobile phone body and the mobile phone cover provide the required recovery force to the mobile phone cover detached from the mobile phone body to facilitate the engagement of the mobile phone cover with the mobile phone body.

2. Description of Related Art

Normally, a cover is attached to a mobile phone to unintentional activation of the phone by the user and to prevent contamination from environmental pollutants. Patents concerning the interrelationship between the mobile phone body and the mobile phone cover introduce all kinds of cover hinges to allow the mobile phone cover to be pivotally connected with the mobile phone body. U.S. Pat. No. 5,628,089 and U.S. Pat. No. 5,640,096 are two patents most relevant to the present invention and thus will be taken as reference in the description. Most cover hinges include only one spring that is either compressed or extended while the mobile phone cover is open with respect to the mobile phone body. After the spring has frequently been in either state for extended periods of time, the spring will fatigue and lose its resilience, which inevitably allows the cover to inadvertently open which obviates the original intention of having the cover prevent unintentional activation of the phone and to prevent contamination. Consequently, a retaining device is usually required to positively hold the mobile phone cover close on the mobile phone body, which increases the complexity of fabrication and the cost.

To overcome the shortcomings, the present invention provides an improved mobile phone cover hinge to mitigate and obviate the aforementioned problems.

SUMMARY OF THE INVENTION

The main objective of the invention is to provide an improved mobile phone cover hinge that allows the mobile phone cover to be easily opened with respect to the mobile phone body.

Another objective of the invention is to provide an improved mobile phone cover hinge that does not require a retaining device to hold the mobile phone cover closed.

Other objects, advantages and novel features of the invention will become more apparent from the following detailed description when taken in conjunction with the accompanying drawings.

DETAILED DESCRIPTION OF PREFERRED EMBODIMENT

Figure 1:
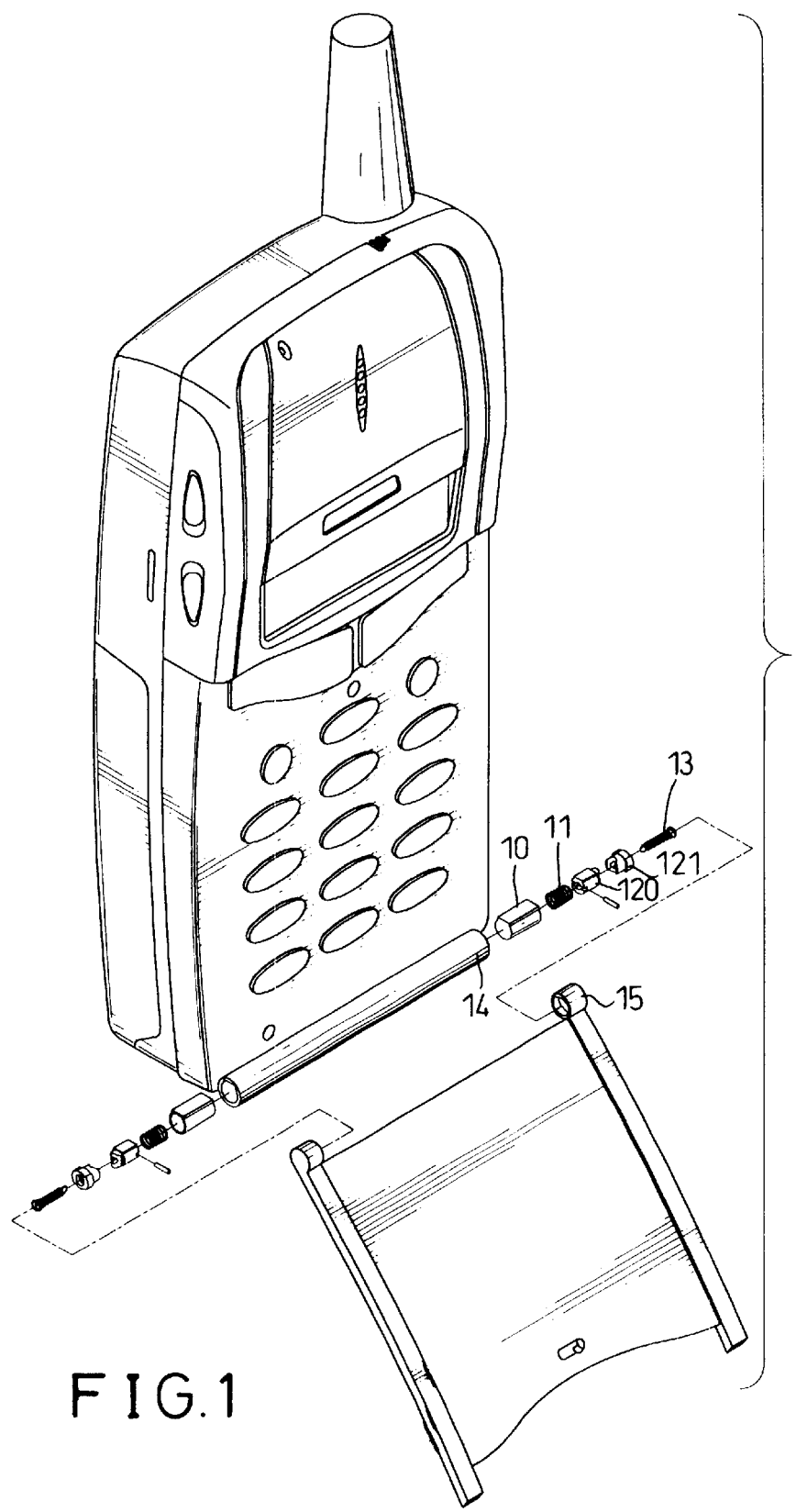
FIG. 1 is an exploded perspective view of a cover hinge in accordance with the present invention on a mobile phone.
Figure 2:
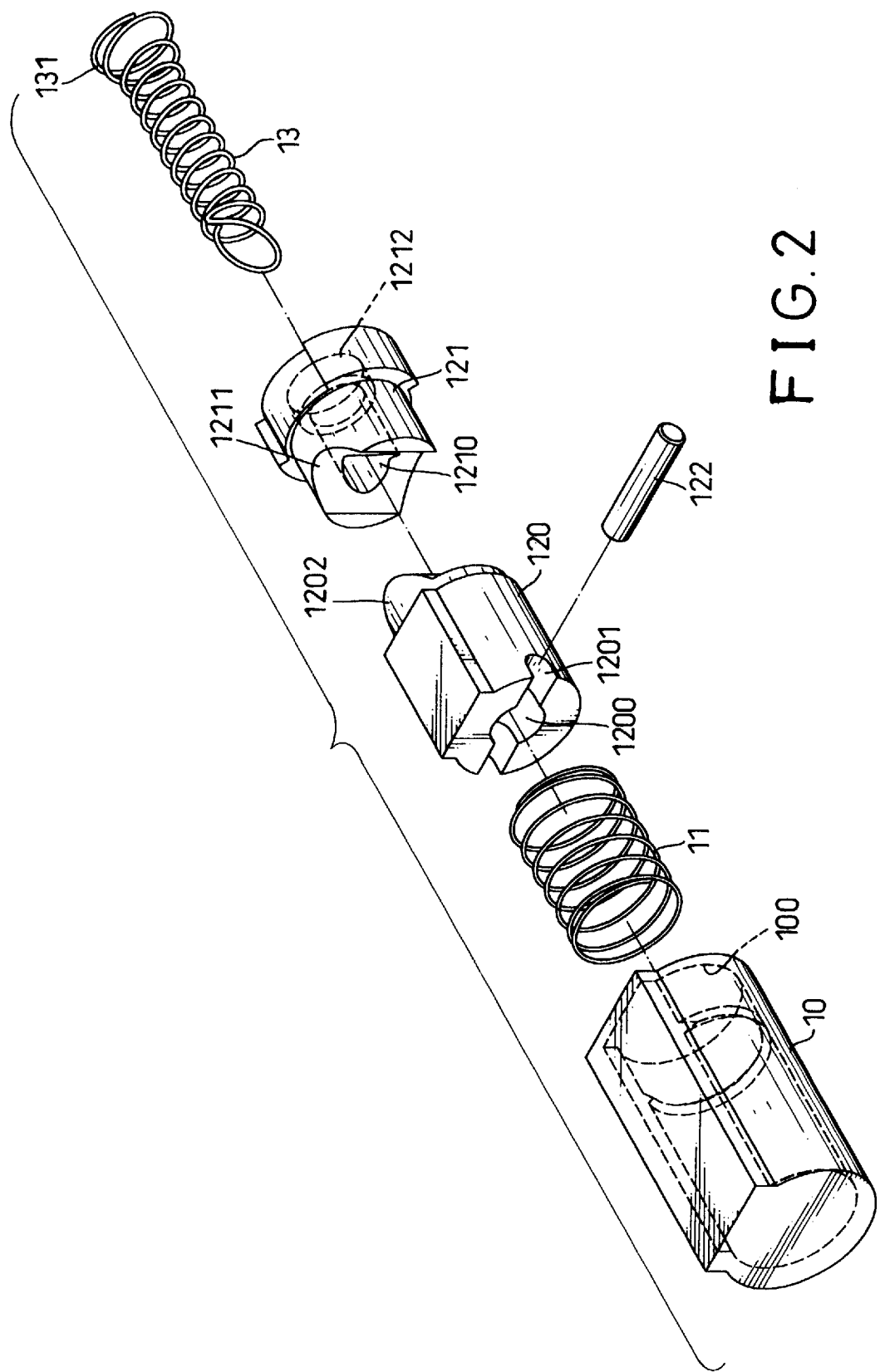
FIG. 2 is an enlarged exploded perspective view of the cover hinge in FIG. 1.

With reference to FIG. 1 and FIG. 2, the mobile phone cover hinge in accordance with the present invention has a sleeve (10), a first spring (11), a driven block (120), a driving block (121) and a second spring (13).

The sleeve (10) is adapted to be securely received in the mobile phone body (14) and has an axial blind hole (100) defined to receive the first spring (11).

The driven block (120) is slidably mounted in the sleeve (10) and has a first end facing the sleeve (10), a second end, an axial through hole (1200), a transverse notch (1201) on the first end orthogonal to the through hole (1200) and a transverse curved extension (1202) on the second end. A pin (122) is inserted and securely held in the notch (1201).

The driving block (121) is partially and securely received in the mobile phone cover (15) to detachably engage with the curved extension (1202) on the driven block (120). That is, the driving block (121) has a first portion extending into the mobile phone body (14) and a second portion extending into the mobile phone cover (15). The driving block (121) has an axial through hole (1210), a transverse concave groove (1211) orthogonal to the through hole (1210) defined on an end that abuts the driven block (120) and corresponding to the curved extension (1202) on the second end of the driven block (120). The second spring (13) is received in the through hole (1210) and has a head portion (131) with a diameter greater than a diameter of the through hole (1210), such that the head portion (131) rests in a recess (1212) defined in an end opposite to the concave groove (1211).

Figure 3:
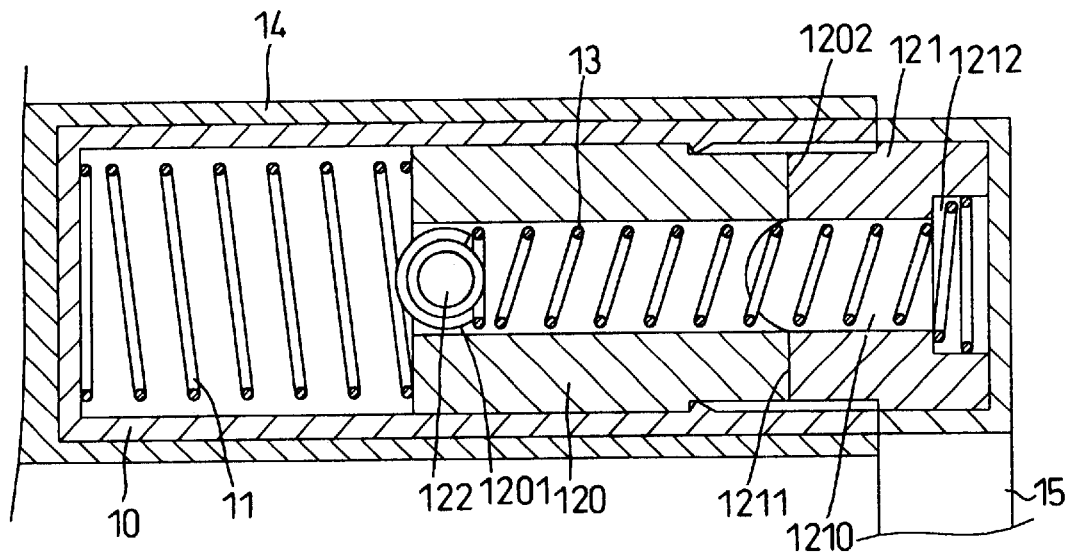
FIG. 3 is a cross sectional front plan view of the cover hinge in FIG. 2.
Figure 4:
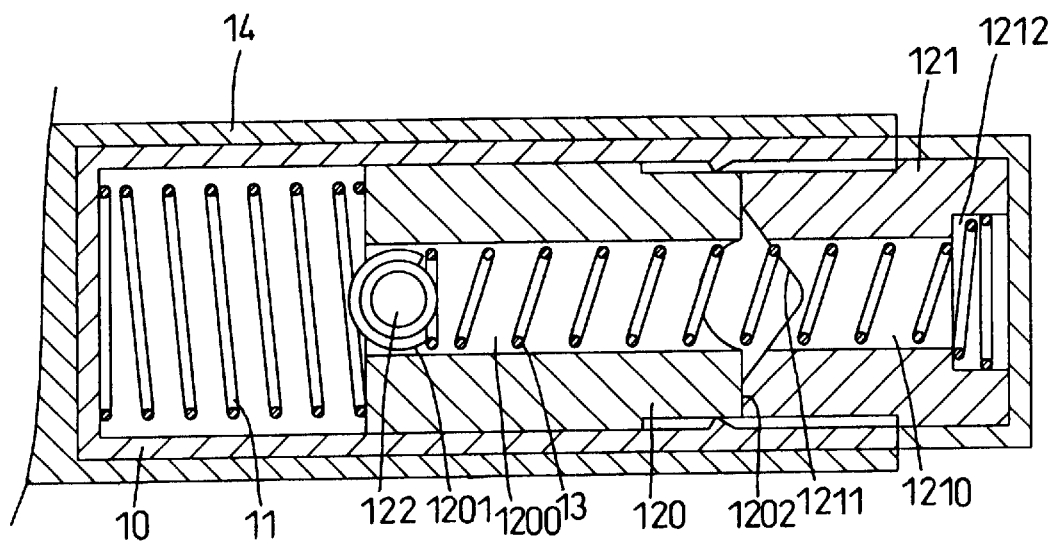
FIG. 4 is an operational cross sectional front plan side view of the cover hinge in FIG. 2 showing the extension of the second spring and the compression of the first spring when the mobile phone cover is opened with respect to the mobile phone body.

With reference to FIG. 3 and FIG. 4, when the cover hinge is installed in the mobile phone body (14) and the mobile phone cover (15), the first end face of the driven block (120) abuts a free end of the first spring (11). After the second spring (13) is inserted through the through hole (1210) of the driven block (121) and the through hole (1200) of the driven block (120) with the head portion (131) securely received in the recess (1212), the pin (122) is inserted and received in the notch (1201) through a loop in the second spring (13) and therefore secures the free end of the second spring (13). After the assembly, the curved extension (1202) mates with the concave groove (1211), the first spring (11) is compressed, and the second spring (13) is stretched.

When the mobile phone cover (15) pivots, the driving block (121) also rotates due to the secure engagement of the driving block (121) in the mobile phone cover (15). As the driving block (121) rotates, the concave groove (1211) disengages from the curved extensions (1202) and forces the driven block (120) to move away from the driving block (121) and further into the blind hole (100) of the sleeve (10). The movement of the driven block (120) further compresses the first spring (11) and stretches the second spring (13).

When the mobile phone cover (15) pivots 180°, the curved extension (1202) again aligns with the concave groove (1211). The compression of the first spring (11) and tension on the second spring (13) holds the curved extension (1202) in the concave groove (1211) and keeps the cover (15) in the open position. When the mobile phone cover (15) is pivoted to cover the mobile phone body (14), the stored energy in the first and the second springs (11, 13) enables the mobile phone cover (15) to quickly return to the closed position with respect to the mobile phone body (14).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover hinge for a mobile phone having a mobile phone body and a mobile phone cover pivotally connected with the mobile phone body, the cover hinge comprising:

a sleeve securely received in the mobile phone body and having an axial blind hole defined to receive a first spring that is compressibly received in the blind hole;

a driven block securely received in the sleeve to abut a free end of the first spring and having a through hole and a transverse curved extension formed on an end face opposite to an end face of the driven block abutting the first spring;

a driving block detachably engaged with the driven block and partially and securely received in the mobile phone cover, the driving block having an axial through hole, a transverse concave groove defined to communicate with the through hole of the driving block and correspond to the curved extension of the driven block; and a second spring stretchably inserted through the through hole of the driving block and the through hole of the driven block.

2. The cover hinge as claimed in claim 1, wherein the driven block further has a transverse notch defined in an end of the driven block abutting the first spring and orthogonal to the through hole of the driven block so as to allow a pin to be received in the notch to secure a free end of the second spring.

3. The cover hinge as claimed in claim 2, wherein the second spring has a head portion having a diameter greater than a diameter of the through hole of the driving block such that the head portion of the second spring rests in an end face of the driving block.

4. The cover hinge as claimed in claim 3, wherein the driving block has a recess defined to receive the head portion of the second spring.

\* \* \* \* \*